United States Patent
Iwaya et al.

(10) Patent No.: US 10,232,712 B2
(45) Date of Patent: Mar. 19, 2019

(54) HYBRID VEHICLE DISPLAY DEVICE (71) Applicant: MITSUBISHI JIDOSHA KOGYO KABUSHIKI KAISHA, Tokyo (JP)

(72) Inventors: Norifumi Iwaya, Tokyo (JP); Kenichi Kunii, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/512,300

(22) PCT Filed: Oct. 21, 2015

(86) PCT No.: PCT/JP2015/079625
§ 371 (c)(1),
(2) Date: Mar. 17, 2017

(87) PCT Pub. No.: WO2016/067980
PCT Pub. Date: May 6, 2016

(65) Prior Publication Data
US 2017/0274774 A1 Sep. 28, 2017

(30) Foreign Application Priority Data
Oct. 30, 2014 (JP) ................................ 2014-221087

(51) Int. Cl.
*B60K 6/22* (2007.10)
*B60K 6/44* (2007.10)
(Continued)

(52) U.S. Cl.
CPC ................ *B60K 35/00* (2013.01); *B60K 6/22* (2013.01); *B60K 6/44* (2013.01); *B60K 6/52* (2013.01);
(Continued)

(58) Field of Classification Search
None
See application file for complete search history.

(56) References Cited

U.S. PATENT DOCUMENTS

2010/0207755 A1  8/2010  Watson et al.
2012/0179313 A1* 7/2012  Hartl ................... B60R 16/0236
                                                         701/22

FOREIGN PATENT DOCUMENTS

DE   10 2009 028 369 A1    2/2011
DE      102009028369 A1 *  2/2011  ............... B60K 6/46
(Continued)

OTHER PUBLICATIONS

Oracle ("Oracle Fusion Middleware—Web User Interface Developer's Guide for Oracle Application Development Framework", 2011, https://docs.oracle.com/cd/E24382_01/web.1112/e16181.pdf).*

(Continued)

*Primary Examiner* — Xin Sheng
(74) *Attorney, Agent, or Firm* — Birch, Stewart, Kolasch & Birch, LLP (57) ABSTRACT A display device is provided with a fuel gauge (40) that displays the amount of fuel remaining in a fuel tank (24) (remaining amount) of a hybrid vehicle (10) provided with an engine (13) that consumes fuel supplied from the fuel tank (24) and generates power by driving wheels (15) or rotating a motor (11). The hybrid vehicle is provided with a non-traveling/non-power generating mode, or in other words, a fuel consumption mode or an engine maintenance mode in which the engine (13) is forced to run and consume fuel for purposes other than traveling or generating power. Of the fuel (41*a*) displayed in the fuel gauge (40), the region (41*aa*) corresponding to the amount of fuel consumed in the (Continued)

non-traveling/non-power generating mode is displayed so as to be distinguishable by color from another region (41*ab*).

8 Claims, 4 Drawing Sheets

(51) Int. Cl.
| | |
|---|---|
| *B60K 6/52* | (2007.10) |
| *B60K 35/00* | (2006.01) |
| *B60R 16/02* | (2006.01) |
| *B60W 10/06* | (2006.01) |
| *B60W 20/00* | (2016.01) |
| *B60W 50/14* | (2012.01) |
| *F02D 45/00* | (2006.01) |
| *G06T 11/00* | (2006.01) |
| *G06T 11/60* | (2006.01) |

(52) U.S. Cl.
CPC ............ *B60R 16/02* (2013.01); *B60W 10/06* (2013.01); *B60W 20/00* (2013.01); *B60W 50/14* (2013.01); *F02D 45/00* (2013.01); *G06T 11/001* (2013.01); *G06T 11/60* (2013.01); *B60K 2350/1076* (2013.01); *B60K 2350/2008* (2013.01); *B60W 2560/04* (2013.01); *B60Y 2200/92* (2013.01); *Y02T 10/623* (2013.01); *Y02T 10/6243* (2013.01); *Y02T 10/6265* (2013.01); *Y10S 903/904* (2013.01)

(56) References Cited

FOREIGN PATENT DOCUMENTS

| | | |
|---|---|---|
| EP | 2 570 319 A1 | 3/2013 |
| JP | 2003-217630 A | 7/2003 |
| JP | 2012-30667 A | 2/2012 |
| JP | 2012-30668 A | 2/2012 |
| JP | 2013-180739 A | 9/2013 |
| WO | WO 2006/001809 A1 | 1/2006 |
| WO | WO 2012/038790 A1 | 3/2012 |

OTHER PUBLICATIONS

Extended European Search Report dated Jan. 4, 2018 issued in corresponding European Application No. 15854951.9.

* cited by examiner

HYBRID VEHICLE DISPLAY DEVICE

TECHNICAL FIELD

The present invention relates to a display device for a hybrid vehicle including an engine (internal combustion engine) and a motor (electric motor) as driving sources, which is particularly suitable for a plug-in hybrid vehicle the battery of which can be charged using an external commercial power source.

BACKGROUND ART

Conventionally, hybrid vehicles including an engine and motors have been developed, and in recent years, plug-in hybrid vehicles the battery of which can be charged using an external commercial power source have also been developed (Patent Document 1).

Some plug-in hybrid vehicles are configured to switch depending on the driving state between an EV mode in which the driving wheels are driven by only motors as power sources, a series mode in which the engine is used as an electric power supply source (electric generator) for the motors while the motors are used as power sources, and a parallel mode in which both the engine and the motors are used as power sources. This enables a significant reduction in fuel consumption.

Meanwhile, if the fuel to be used for the engine remains in the fuel tank or pipes for a long period of time, the fuel changes in quality and deteriorates due to oxidation, dissolution of water, and the like. For example, volatile components of the fuel evaporate, and the ratio of the fuel components sometimes becomes unsuitable. Such change and deterioration of the fuel may cause rusting in the fuel tank, or a problem that the engine will not exhibit sufficient performance when running.

In other words, hybrid vehicles have the advantage that the fuel consumption can be reduced compared to gasoline vehicles, but at the same time have the problem that it is likely the fuel remains in the fuel tank for a long period of time and causes the problems described above.

In particular, plug-in hybrid vehicles are capable of performing electric travelling for a long time by externally charging the battery, without consuming the fuel in the fuel tank for a long time. Hence, depending on the usage by the user, plug-in hybrid vehicles are used in the EV mode, in other words, used as an electric vehicle for everyday use, which makes the problems by the fuel deterioration more likely to occur.

In addition, while an engine is left unused for a long time, oil (oil film) attached to the cylinders and other parts falls off due to gravity and vibration during travelling, which decreases the protection performance against friction between metal parts. If the engine is started repeatedly without enough oil film (dry start), there is a risk of damage such as frictional wear or burning out of parts inside the engine. Moreover, leaving the engine unused for a long time sometimes causes sticking inside an injector (fuel injection device) and air entrainment in a fuel pipe, which prevent a smooth start of the engine.

In summary, while hybrid vehicles have the advantage of less fuel consumption than gasoline vehicles, there is a problem that if the engine is left unused for a long time, the problems described above are likely to occur.

In particular, plug-in hybrid vehicles are capable of performing electric travelling for a long time by externally charging the battery, without consuming the fuel in the fuel tank for a long time. Hence, depending on the usage by the user, plug-in hybrid vehicles are used in the EV mode, in other words, used as an electric vehicle for everyday use. As a result, plug-in hybrid vehicles are likely to fall into the case described above, which makes the problems caused by leaving the engine unused for a long time more likely to occur.

PRIOR ART DOCUMENT

Patent Document

Patent Document 1: Japanese Patent Application Publication No. 2012-30668

SUMMARY OF THE INVENTION

Problems to be Solved by the Invention

To solve the problems on the fuel deterioration described above, typical plug-in hybrid vehicles have a "fuel consumption mode" in which the engine is forced to run to consume fuel in the case where a specified amount of refueling has not been done for a specified period. After performing the fuel consumption mode, the vehicle prompts a specified amount or more of refueling to keep the freshness of the fuel in the fuel tank. In this way, in the fuel consumption mode, the engine is forced to run to prevent the deterioration and change in quality of the fuel remaining in the fuel tank. However, the amount of fuel to be consumed in the fuel consumption mode, in other words, the required consumption amount is not conventionally displayed to the driver.

For this reason, the driver sometimes feels anxious because the driver cannot see how the fuel is consumed in the fuel consumption mode.

Meanwhile, to solve the problems caused by leaving an engine unused for a long time described above, typical plug-in hybrid vehicles have an "engine maintenance mode" in which the engine is forced to run in the case where operation of the engine (=fuel consumption=opportunity of refueling) does not take place for a specified period of time. By performing the engine maintenance mode, appropriate functions in the engine are maintained.

In this way, in the engine maintenance mode, the engine is forced to run to maintain appropriate functions in the engine. However, the amount of fuel to be consumed in the engine maintenance mode, in other words, the required consumption amount is not conventionally displayed to the driver.

For this reason, the driver sometimes feels anxious because the driver cannot see how the fuel is consumed in the engine maintenance mode.

The present invention has been made in view of the aforementioned conventional art, and an object of the present invention is to provide a display device that displays the required consumption amount, in other words, the status of the engine continuously running, in the fuel consumption mode or the engine maintenance mode.

Note that since the fuel consumption mode and the engine maintenance mode mean forcibly running the engine to consume fuel for purposes other than traveling and power generation, the fuel consumption mode and the engine maintenance mode are collectively called a non-traveling•non-power generating mode in the present invention. In other words, the non-traveling•non-power generating mode means the fuel consumption mode or the engine maintenance mode.

Means for Solving the Problems

A display device for a hybrid vehicle according to a first aspect of the present invention to solve the aforesaid problems is a display device for a hybrid vehicle including: a motor that drives a wheel with electric power supplied from a battery; an engine that consumes fuel supplied from a fuel tank, and drives the wheel or generates electricity for the motor; and a non-traveling•non-power generating mode in which the engine is forced to run to consume the fuel for a purpose other than travelling and power generation, characterized in that the display device includes: a fuel gauge that displays the amount of the fuel remaining in the fuel tank; and a display device that displays a region corresponding to the amount of fuel to be consumed in the non-traveling•non-power generating mode, of the fuel displayed in the fuel gauge, such that the region is distinguishable by color from another region of the fuel.

A display device for a hybrid vehicle according to a second aspect of the present invention to solve the aforesaid problems is the display device for a hybrid vehicle according to the first aspect, wherein an area of the region corresponding to the amount of the fuel to be consumed in the non-traveling•non-power generating mode decreases while the non-traveling•non-power generating mode is performed.

A display device for a hybrid vehicle according to a third aspect of the present invention to solve the aforesaid problems is the display device for a hybrid vehicle according to the first aspect, wherein the battery is rechargeable using an external commercial power source.

A display device for a hybrid vehicle according to a fourth aspect of the present invention to solve the aforesaid problems is the display device for a hybrid vehicle according to the fourth aspect, wherein the non-traveling•non-power generating mode is a fuel consumption mode for preventing deterioration and change in quality of the fuel remaining in the fuel tank.

A display device for a hybrid vehicle according to a fifth aspect of the present invention to solve the aforesaid problems is the display device for a hybrid vehicle according to the first aspect, wherein characterized in that the non-travelin•non-power generating mode is an engine maintenance mode for maintaining an appropriate functioning of the engine.

Effect of the Invention

The display device for a hybrid vehicle according to the present invention is provided with the fuel gauge capable of displaying the region corresponding to the amount of fuel to be consumed in the non-traveling•non-power generating mode for purposes other than traveling and power generation such that the region is distinguishable by color from another region indicating the remaining fuel. As a result, the display device for a hybrid vehicle according to the present invention can display the state of the engine continuously running in the non-traveling•non-power generating mode, as a status visually and clearly, and makes it possible to obtain the advantageous effect which enables the driver to see how the fuel is being consumed in the non-traveling•non-power generating mode.

MODE FOR CARRYING OUT THE INVENTION

Hereinafter, descriptions will be provided for an embodiment of the present invention based on embodiments.
Embodiment 1

Figure 1:
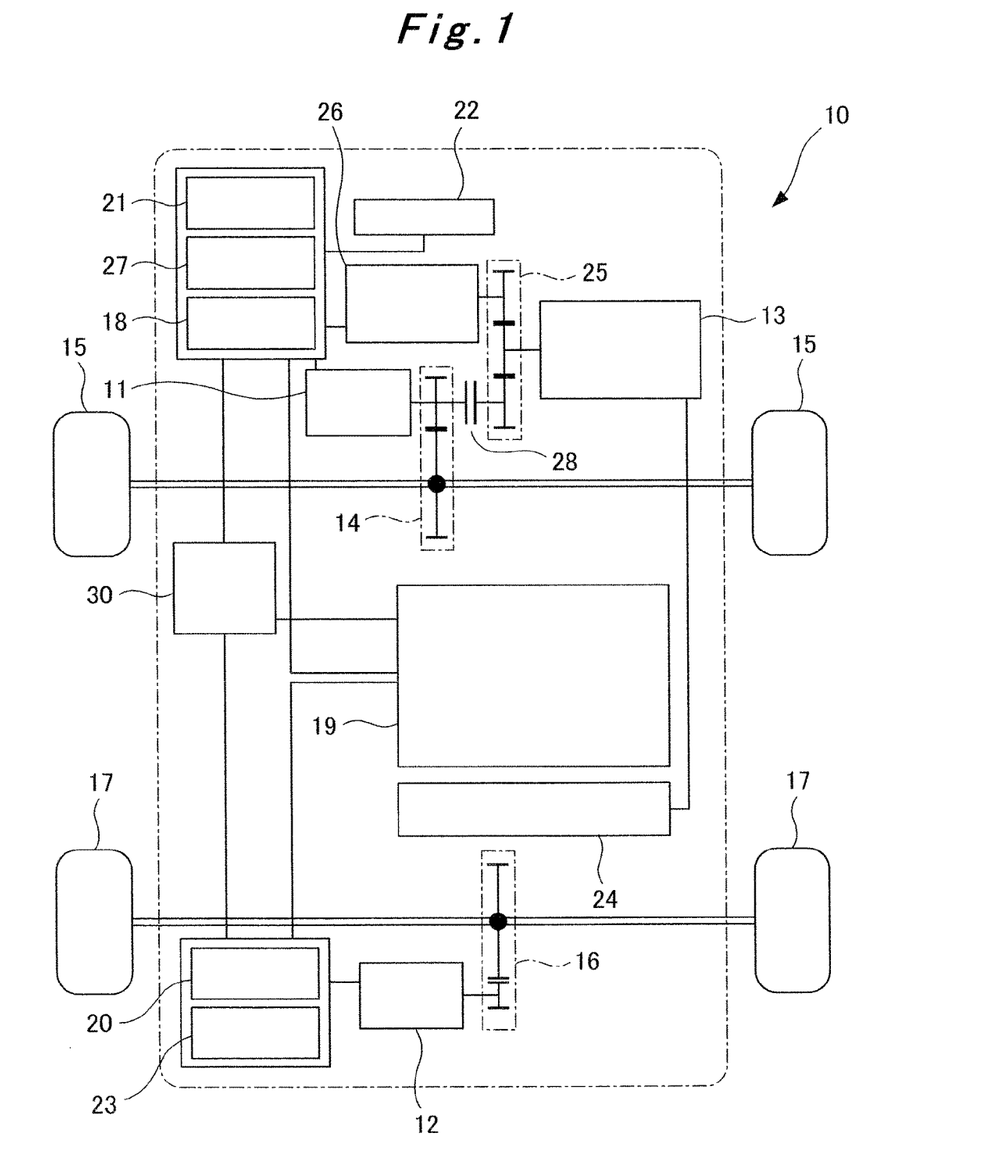
FIG. 1 is a schematic diagram illustrating a hybrid vehicle.
Figure 2:
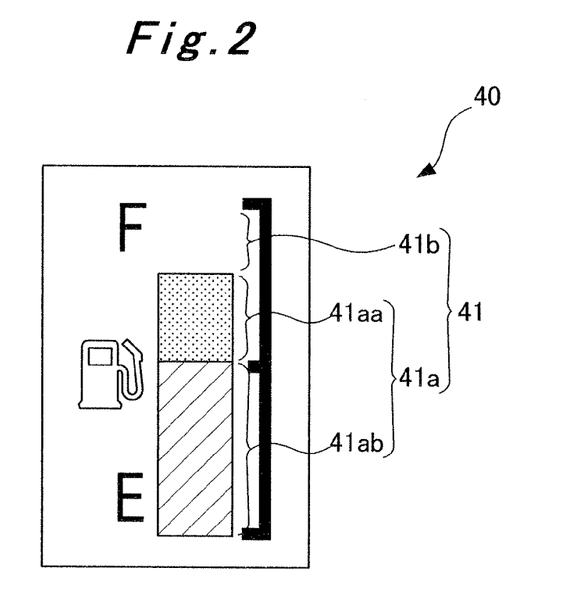
FIG. 2 is a schematic diagram illustrating a display device for a hybrid vehicle.
Figure 3:
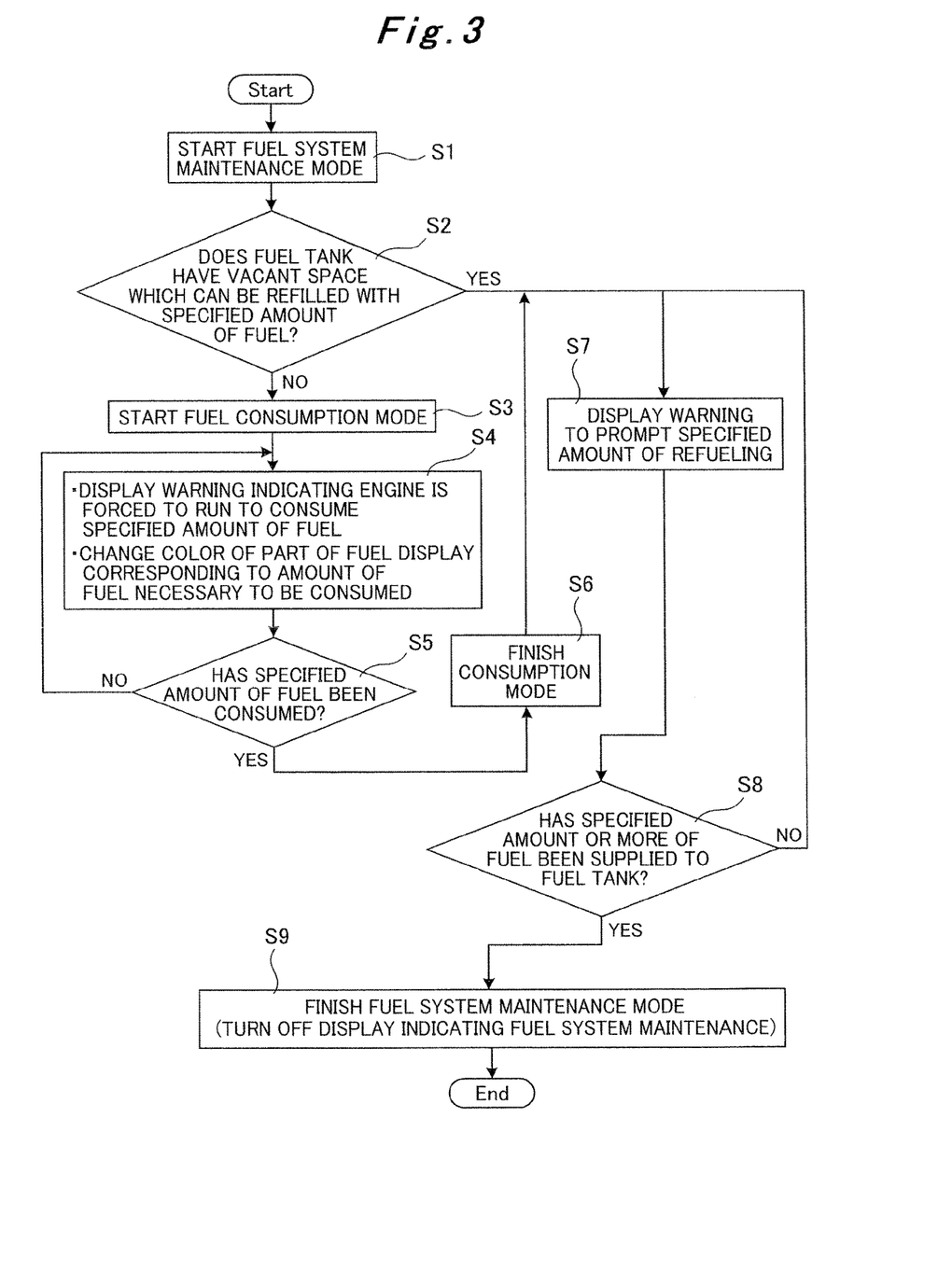
FIG. 3 is a flowchart showing a fuel system maintenance mode of a hybrid vehicle according to a first embodiment of the present invention.

FIGS. 1 to 3 illustrate a display device for a hybrid vehicle according to a first embodiment of the present invention.

This embodiment is one in which the present invention is applied to a hybrid vehicle having a fuel consumption mode as a non-traveling•non-power generating mode.

Specifically, as illustrated in FIG. 1, a hybrid vehicle (hereinafter also simply referred to as a "vehicle") 10 according to this embodiment is what is called a plug-in hybrid vehicle, and includes a front motor 11 and a rear motor 12, and an engine 13, as driving sources for travelling. The driving force of the front motor 11 is transmitted via a front drive transmission mechanism 14 to front wheels 15. The driving force of the rear motor 12 is transmitted via a rear drive transmission mechanism 16 to rear wheels 17.

A battery 19 is connected to the front motor 11 via a front (Fr) motor inverter 18, and the battery 19 is connected to the rear motor 12 via a rear (Re) motor inverter 20. The electric power corresponding to the pedal operation of the occupant is supplied from the battery 19 via these inverters 18 and 20 to the motors 11 and 12, respectively.

In addition, a sub-battery (12V battery) 22 for driving auxiliary machinery is connected to the battery 19 via a DC/DC converter 21. When the amount of charge in the sub-battery 22 lowers, the sub-battery 22 is charged by the battery 19. In addition, a vehicle mounted battery charger 23 is connected to the battery 19 so that the battery 19 can be charged also by an external commercial power source.

The engine 13 is driven by burning the fuel supplied from a fuel tank 24. A generator (electric generator) 26 is connected to the engine 13 via an output system 25. The generator 26 is connected via a generator inverter 27 to the battery 19 (and the front motor 11). The output system 25 is connected to the generator 26 on one hand, and to the front drive transmission mechanism 14 via a clutch 28 on the other hand.

When the engine 13 is driven in accordance with the driving state of the vehicle 10, the driving force of the engine 13 is first transmitted via the output system 25 to the generator 26. The generator 26 operates with the driving force of the engine 13, and the electric power generated by the generator 26 is supplied to the front motor 11 and the battery 19 as appropriate. When the clutch 28 is engaged in accordance with the driving state of the vehicle 10, the driving force of the engine 13 is also transmitted via the front drive transmission mechanism 14 to the front wheels 15.

Further, the vehicle 10 is provided with a control device (ECU) 30 that comprehensively controls various devices mounted on the vehicle 10. The control device 30 grasps the driving state of the vehicle 10 based on signals from various sensors provided in the vehicle 10 and comprehensively controls the various devices based on the driving state.

Specifically, the traveling mode is also selected by this control device 30 depending on the driving state of the vehicle 10.

In addition, the control device 30 has a "fuel consumption mode" in which in the case where a specified amount of refueling has not been done for a specified period, the engine 13 is forced to run to prevent the deterioration and change in quality of the fuel remaining in the fuel tank 24. An example is the case where the engine has sat unused with the fuel tank full for six months and 15 liters or more of refueling has not been done during the period.

Further in this embodiment, the vehicle 10 includes a fuel gauge 40 illustrated in FIG. 2 as a display device. In this fuel gauge 40, an English letter E (empty) is arranged at a lower part, and an F (full) at an upper part, and a mark of the fuel dispenser as a symbol is arranged at a middle part. At a side of these, a rectangular display portion (scale) 41 is arranged extending continuously in an up and down direction.

The display portion 41 includes a remaining amount portion 41a indicating the amount corresponding to the fuel currently remaining in the fuel tank 24 (remaining amount) and a vacant space portion 41b indicating the amount corresponding to the vacant space of the fuel tank 24 which can be currently refueled. The vacant space portion 41b has the same color as the background color.

The remaining amount displayed at the remaining amount portion 41a is calculated by the control device 30 based on the height measured by a fuel level sensor (illustration thereof omitted) provided to the fuel tank 24.

The remaining amount portion 41a includes a remaining amount upper portion (shown stippled in the FIG. 41aa displaying the amount corresponding to a required consumption amount in the fuel consumption mode and a remaining amount lower portion (shown hatched in the FIG. 41ab displaying the amount corresponding to the value obtained by subtracting the required consumption amount in the fuel consumption mode from the amount of the fuel remaining in the fuel tank. For example, the remaining amount upper portion 41aa is displayed in an orange color, and the remaining amount lower portion 41ab in a blue color.

The required consumption amount in the fuel consumption mode displayed by the remaining amount upper portion 41aa, that is, the amount of fuel to be consumed to prevent the deterioration and change in quality of the fuel remaining in the fuel tank 24 may be determined in advance as a constant amount (for example, one third of the fuel tank≈15 liters). Alternatively, the required consumption amount may be obtained by calculation of the control device 30 based on the period for which there has been no refueling.

Note that the remaining amount upper portion 41aa is displayed such that the area thereof decreases gradually in accordance with the consumption of the fuel while the fuel consumption mode is performed. The color of the portion corresponding to the consumed fuel is changed to the background color.

Here, FIG. 2 shows a display in the fuel system maintenance mode as described later, which is capable of displaying the status on how much the required consumption amount in the fuel consumption mode is visually and clearly because the remaining amount upper portion 41aa and the remaining amount lower portion 41ab have different colors in the fuel system maintenance mode. Note that except when in the fuel system maintenance mode, the remaining amount upper portion 41aa has the same color as the remaining amount lower portion 41ab. As described in FIG. 3, the fuel system maintenance mode includes the fuel consumption mode.

Note that FIG. 2 shows an example of the fuel gauge 40, and various modifications can be made thereto. For example, the display portion 41 may be a digital display portion in which multiple segments having different colors are stacked, or an analog meter display using needles having different colors, and also the shape may be not only rectangular but of a semicircular arc shape. In any way, of the remaining amount, the region corresponding to the fuel amount to be consumed in the fuel consumption mode only needs to be displayed to be distinguishable by color from the other region of the remaining amount.

In addition, in the fuel system maintenance mode described later, a display indicating the fuel system maintenance mode, a warning indicating that the engine is forced to run to consume a specified amount of fuel, and a warning to prompt a specified amount of refueling may be added in the fuel gauge 40. Or alternatively, these indications may be displayed at other positions to attract extra attention of the driver.

Further, in the fuel gauge 40, a display portion numerically indicating the required consumption amount in the fuel consumption mode/the fuel amount already consumed in the fuel consumption mode may be added. In addition, a display portion may be added to show a bar graph or a numerical value indicating the time needed to perform the fuel consumption mode/the elapsed time. Such times are also obtained by calculation of the control device 30.

Descriptions will be provided for the display of the fuel gauge 40 when the fuel consumption mode according to this embodiment is performed, referring to a flowchart shown in FIG. 3. Specifically, FIG. 3 shows the fuel system maintenance mode for displaying the required consumption amount in the fuel consumption mode in which the engine is caused to run to forcibly consume fuel, that is, the status of the engine continuously running.

First, the control device 30 starts the fuel system maintenance mode (step S1), displays to the effect, and then determines whether or not the fuel tank 24 has a vacant space which can be refilled with a specified amount of fuel (step S2). The specified amount may be, for example, 15 liters.

Next, if NO at step S2, in other words, if the fuel tank 24 does not have a vacant space that can be refilled with the specified amount of fuel, the control device 30 starts the fuel consumption mode in which the engine 13 is forced to run (step S3).

In the fuel consumption mode, as illustrated in FIG. 2, a warning is displayed indicating the engine is forced to run to consume the specified amount of fuel. At the same time, a part of the fuel display corresponding to the amount of fuel necessary to be consumed in the fuel consumption mode is changed in color. In other words, in the remaining amount portion 41a, the remaining amount upper portion 41aa and the remaining amount lower portion 41ab are differentiated by color. Then, the remaining amount upper portion 41aa is displayed such that the area thereof decreases gradually in accordance with the consumption of fuel while the fuel consumption mode is performed (step S4).

As the warning indicating that the engine is forced to run, for example, a message, "Fuel system maintenance. Engine will run to consume fuel." is displayed.

Subsequently, the control device 30 determines whether the specified amount of fuel has been consumed (step S5). If NO, step S4 is repeated. On the other hand, if YES, in other words, if the required consumption amount in the fuel consumption mode has been consumed, the fuel consumption mode ends (step S6). When the fuel consumption mode ends, the control device 30 stops the engine 13.

After the fuel consumption mode ends at step S6 and if YES at step S2, in other words, when the fuel tank 24 has a vacant space which can be refilled with the specified amount of fuel, a warning to prompt the specified amount of refueling is displayed (step S7). As the warning to prompt the specified amount of refueling, for example, a message, "Fuel system maintenance. Refill the fuel tank 24 with 15 liters or more of fuel at a time." is displayed.

After displaying the warning at step S7, the control device 30 determines whether or not the specified amount or more of fuel is supplied to the fuel tank 24 (step S8). If NO, step S7 is repeated. On the other hand, if YES, in other words, if the specified amount or more of fuel has been supplied to the fuel tank, the control device 30 turns off the display indicating the fuel system maintenance and other warnings, and finishes the fuel system maintenance mode (step S9).

As specifically described above based on the embodiment, as for the display device for the hybrid vehicle 10 including the fuel consumption mode in which the engine 13 is forced to run to prevent deterioration and change in quality of the fuel remaining in the fuel tank 24, the color of the remaining amount upper portion 41aa of the remaining amount portion 41a displayed on the fuel gauge 40, corresponding to the amount of fuel to be consumed in the fuel consumption mode, is changed to be different from the color of the other portion, which is the remaining amount lower portion 41ab. In addition, the remaining amount upper portion 41aa is displayed such that the area thereof decreases gradually in accordance with the fuel consumption while the fuel consumption mode is performed. Hence the state of the engine 13 continuously running can be displayed as a status visually and clearly, which makes it possible to obtain the advantageous effect that enables the driver to see how the fuel is being consumed in the fuel consumption mode, and makes the driver free from anxiety.

Embodiment 2

Figure 4:
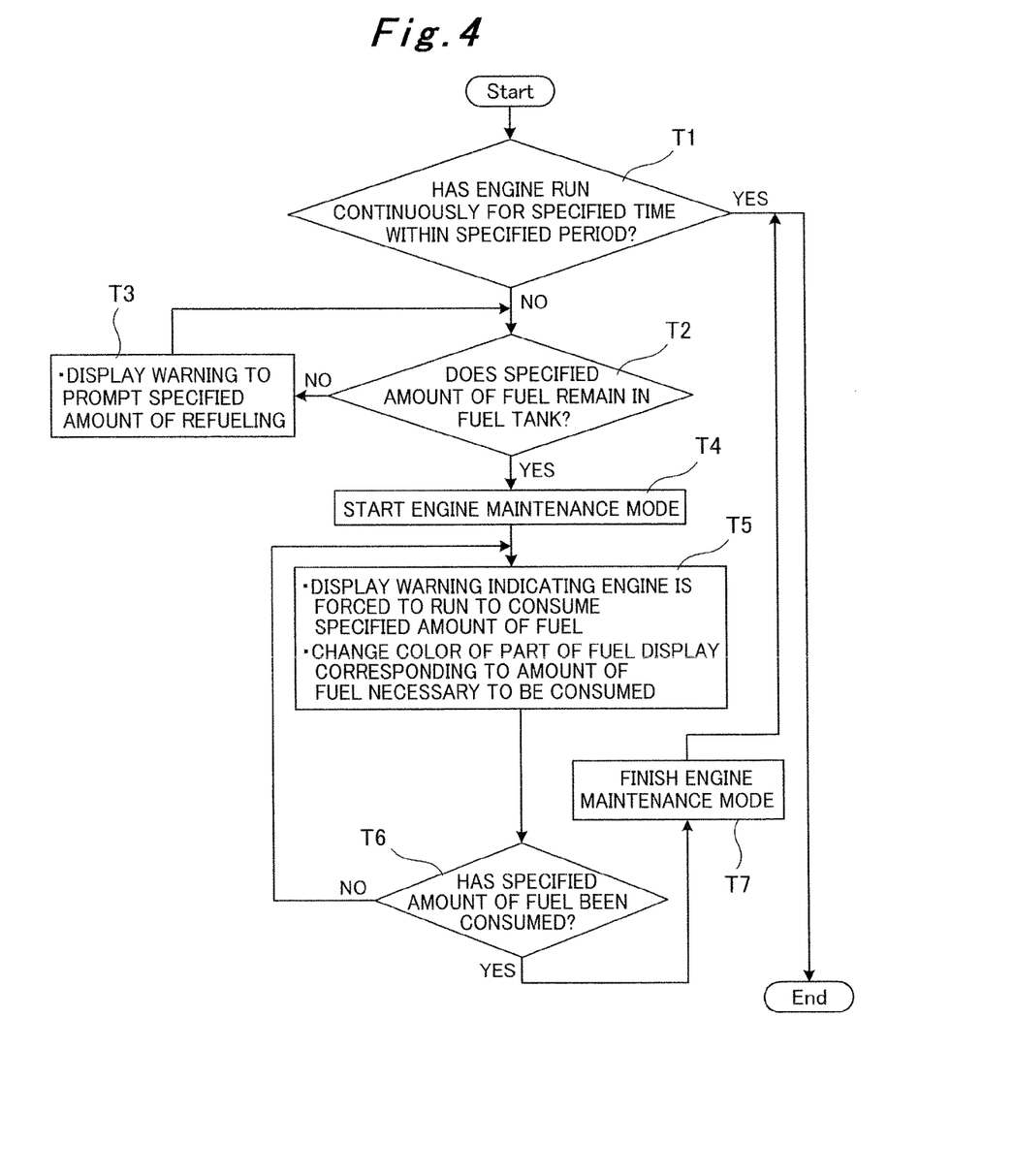
FIG. 4 is a flowchart showing an engine maintenance mode of a hybrid vehicle according to a second embodiment of the present invention.

A display device for a hybrid vehicle according to a second embodiment of the present invention is described in FIGS. 1, 2, and 4.

This embodiment is one in which the present invention is applied to a hybrid vehicle including an engine maintenance mode as a non-traveling•non-power generating mode.

For this reason, a schematic diagram of the hybrid vehicle and a display device for a hybrid vehicle in this embodiment are as illustrated in FIGS. 1 and 2 as in the first embodiment. A feature of the embodiment is performing an engine maintenance mode shown in FIG. 4 instead of the fuel consumption mode shown in FIG. 3.

Specifically, as illustrated in FIG. 1, a hybrid vehicle 10 according to this embodiment is the same as in the first embodiment in that the hybrid vehicle 10 includes: a front motor 11 and a rear motor 12; an engine 13; a front drive transmission mechanism 14 and front wheels 15; a rear drive transmission mechanism 16 and rear wheels 17; a front (Fr) motor inverter 18 and a battery 19; a rear (Re) motor inverter 20; a DC/DC converter 21; a sub-battery (12V battery) 22; a vehicle mounted battery charger 23; a fuel tank 24; an output system 25, a generator (electric generator) 26, and a generator inverter 27; and a clutch 28.

In addition, this embodiment is the same as the first embodiment also in that the vehicle 10 is provided with a control device (ECU) 30 that comprehensively controls various devices mounted on the vehicle 10.

In particular, the control device 30 includes an "engine maintenance mode" instead of the "fuel consumption mode" in the first embodiment, in which in the case operation of the engine (=fuel consumption =opportunity of refueling) does not take place for a certain period of time, the engine 13 is forced to run to maintain appropriate functions in the engine. Note that this embodiment is the same as the first embodiment in that the control device 30 in this embodiment also has a non-traveling•non-power generating mode because the engine maintenance mode is a "non-traveling•non-power generating mode" the same as the fuel consumption mode is.

In addition, this embodiment is also the same as the first embodiment in that a fuel gauge 40 illustrated in FIG. 2 is included as a display device in the vehicle 10.

This fuel gauge 40 is the same as in the first embodiment in that the fuel gauge 40 includes a rectangular display portion (scale) 41 extending continuously in an up and down direction and the display portion 41 includes a remaining amount portion 41a indicating the amount corresponding to the fuel currently remaining in the fuel tank 24 (remaining amount) and a vacant space portion 41b indicating the amount corresponding to the vacant space of the fuel tank 24 which can be currently refueled.

In particular, the remaining amount portion 41a includes a remaining amount upper portion (shown stippled in the figure) 41aa and a remaining amount lower portion (shown hatched in the figure) 41ab, the remaining amount upper portion 41aa indicating the amount corresponding to the required consumption amount in the engine maintenance mode instead of the fuel consumption mode. In the same way, the remaining amount lower portion 41ab indicates the amount corresponding to the value obtained by subtracting the required consumption amount in the engine maintenance mode, instead of in the fuel consumption mode, from the amount of the fuel remaining in the fuel tank. For example, the remaining amount upper portion 41aa may be displayed in an orange color, and the remaining amount lower portion 41ab in a blue color.

The required consumption amount in the engine maintenance mode, indicated by the remaining amount upper portion 41aa, in other words, the amount of fuel consumed to maintain appropriate functions in the engine may be determined in advance as a constant amount (for example, 2 to 5 liters). Note that the required consumption amount may be obtained by calculation of the control device 30 based on the period for which there has been no refueling.

Further, the remaining amount upper portion 41aa is displayed such that the area thereof decreases in accordance with the fuel consumption while the engine maintenance mode is performed. The color of the portion corresponding to the consumed fuel is changed to the background color.

Here, FIG. 2 shows a display in the engine maintenance mode as described later. In the engine maintenance mode, the colors of the remaining amount upper portion 41aa and the remaining amount lower portion 41ab are different from each other, which makes it possible to display visually and clearly a status on how much the required consumption amount in the engine maintenance mode is. Note that except when in the engine maintenance mode, the color of the remaining amount upper portion 41aa is the same as that of the remaining amount lower portion 41ab.

Note that FIG. 2 shows an example of the fuel gauge 40, and various modifications can be made thereto. For example, the display portion 41 may be a digital display portion in which multiple segments having different colors are stacked, or an analog meter display using needles having different colors, and also the shape maybe not only rectangular but of a semicircular arc shape. This embodiment is the same as the first embodiment also in that, in any way, of the remaining amount, the region corresponding to the fuel amount to be consumed in the engine maintenance mode only needs to be displayed to be distinguishable by color from the other region of the remaining amount.

In addition, in the engine maintenance mode described later, a warning indicating the engine is forced to run to consume a specified amount of fuel and a warning to prompt a specified amount or more of refueling before the engine maintenance mode is started maybe added in the fuel gauge 40. Or alternatively, these indications may be displayed at other positions to attract extra attention of the driver.

Further, in the fuel gauge 40, a display portion numerically indicating the required consumption amount in the engine maintenance mode/the fuel amount already consumed in the engine maintenance mode may be added. In addition, a display portion may be added to show a bar graph or a numerical value indicating the time needed to perform the engine maintenance mode/the elapsed time. Such times are also obtained by calculation of the control device 30.

Descriptions will be provided for the display of the fuel gauge 40 when the engine maintenance mode according to this embodiment is performed, referring to a flowchart shown in FIG. 4. Specifically, FIG. 4 shows the engine maintenance mode for displaying the required consumption amount in the engine maintenance mode in which the engine is caused to run to forcibly consume fuel, that is, the status of the engine continuously running.

First, the control device 30 determines whether or not the engine has run continuously for a specified time within a specified period (step T1). This is because in order to maintain appropriate functions in the engine, circulation of oil in the engine is necessary, which requires a certain time of continuous operation.

If YES at step T1, the procedure ends without starting the engine maintenance mode. On the other hand, if NO, in other words, in the case where the engine has not run continuously for the specified time within the specified period, the control device 30 determines whether or not a specified amount of fuel remains in the fuel tank 24 (step T2). This is because without the specified amount of fuel in the fuel tank 24, the engine cannot be forced to run.

Next, if NO at step T2, a warning to prompt a specified amount or more of refueling is displayed (step T3). As the warning to prompt a specified amount or more of refueling, for example, a message, "Lack of fuel needed for engine maintenance. Please refuel." is displayed.

On the other hand, if YES at step T2, in other words, in the case where a specified amount of fuel remains in the fuel tank 24, the control device 30 starts the engine maintenance mode in which the engine 13 is forced to run (step T4).

In the engine maintenance mode, as illustrated in FIG. 2, a warning is displayed indicating the engine is forced to run to consume the specified amount of fuel. At the same time, a part of the fuel display corresponding to the amount of fuel necessary to consume in the engine maintenance mode is changed in color. In other words, in the remaining amount portion 41*a*, the remaining amount upper portion 41*aa* and the remaining amount lower portion 41*ab* are differentiated by color. Then, the remaining amount upper portion 41*aa* is displayed such that the area thereof decreases gradually in accordance with the consumption of fuel while the engine maintenance mode is performed (step T5).

As the warning indicating that the engine is forced to run, for example, a message, "For engine maintenance, engine will run to consume fuel." is displayed.

Subsequently, the control device 30 determines whether the specified amount of fuel has been consumed (step T6).

If NO, step S5 is repeated. On the other hand, if YES, in other words, if the required consumption amount in the engine maintenance mode has been consumed, the engine maintenance mode ends (step T7). When the engine maintenance mode ends, the control device 30 stops the engine 13 and turns off the warning.

As specifically described above based on the embodiment, as for the display device for the hybrid vehicle 10 including the engine maintenance mode in which the engine is forced to run to maintain appropriate functions in the engine 13, the color of the remaining amount upper portion 41*aa* of the remaining amount portion 41*a* displayed on the fuel gauge 40, corresponding to the amount of fuel to be consumed in the engine maintenance mode, is changed to be different from the color of the other portion, which is the remaining amount lower portion 41*ab*. In addition, the remaining amount upper portion 41*aa* is displayed such that the area thereof decreases gradually in accordance with the fuel consumption while the engine maintenance mode is performed. Hence the state of the engine 13 continuously running can be displayed as a status visually and clearly, which makes it possible to obtain the advantageous effect that enables the driver to see how the fuel is being consumed in the engine maintenance mode and makes the driver free from anxiety.

INDUSTRIAL APPLICABILITY

The present invention is industrially widely applicable as a display device for a hybrid vehicle, particularly, as a display device for a plug-in hybrid vehicle, including the non-traveling•non-power generating mode.

REFERENCE SIGNS LIST

10 vehicle (hybrid vehicle)
11 front motor
12 rear motor
13 engine
14 front drive transmission mechanism
15 front wheel
16 rear drive transmission mechanism
17 rear wheel
18 front motor inverter
19 battery
20 rear motor inverter
21 DC/DC converter
22 sub-battery
23 vehicle mounted battery charger
24 fuel tank
25 output system
26 generator
27 generator inverter
28 clutch
30 control device
40 fuel gauge
41 display portion
41*a* remaining amount portion
41*aa* remaining amount upper portion
41*ab* remaining amount lower portion
41*b* vacant space portion

The invention claimed is:
1. A display device for a hybrid vehicle including
a motor that drives a wheel with electric power supplied from a battery, an engine that consumes fuel supplied from a fuel tank, and drives the wheel or generates electricity for the motor, and a controller that controls the motor and the engine in a non-traveling non-power generating mode in which the engine is forced to run to consume the fuel for preventing deterioration and change in quality of the fuel remaining in the fuel tank, the display device comprising:

a fuel gauge having a remaining amount display portion that displays the amount of the fuel remaining in the fuel tank;

the remaining amount display portion including a first region that displays an amount of fuel to be consumed in the non-traveling non-power generating mode, and a second region that displays an amount of fuel corresponding to a value obtained by subtracting the amount of fuel to be consumed in the non-traveling non-power generating mode from the amount of fuel remaining in the fuel tank, wherein when the hybrid vehicle performs in the non-traveling non-power generating mode, a display in the non-traveling non-power generating mode, a display in the remaining amount display portion is switched from displaying only the amount of the fuel remaining in the fuel tank to displaying the first region and the second region.

2. The display device for a hybrid vehicle according to claim 1, wherein an area of the first region decreases while the non-traveling•non-power generating mode is performed.

3. The display device for a hybrid vehicle according to claim 1, wherein the battery is rechargeable using an external commercial power source.

4. The display device for a hybrid vehicle according to claim 1, wherein the non-traveling•non-power generating mode is a fuel consumption mode for preventing deterioration and change in quality of the fuel remaining in the fuel tank.

5. The display device for a hybrid vehicle according to claim 1, wherein the non-traveling•non-power generating mode is an engine maintenance mode for maintaining an appropriate functioning of the engine.

6. The display device for a hybrid vehicle according to claim 1, wherein a color of the second region is different from a color of the first region.

7. The display device for a hybrid vehicle according to claim 1, further comprising:

a display portion that prompts a driver of the hybrid vehicle to refuel when a specified amount of fuel has been consumed in the non-traveling non-power generating mode.

8. A hybrid vehicle, comprising:

a motor that drives a wheel with electric power supplied from a battery;

an engine that consumes fuel supplied from a fuel tank, and drives the wheel or generates electricity for the motor;

a controller that controls the motor and the engine in a non-traveling•non-power generating mode in which the engine is forced to run to consume the fuel for a purpose other than travelling and power generation;

a fuel gauge having a remaining amount display portion that displays the amount of fuel remaining in the fuel tank;

the remaining amount display portion including a first region that displays an amount of fuel to be consumed in the non-traveling•non-power generating mode, and a second region that displays an amount corresponding to a value obtained by subtracting the amount of fuel to be consumed in the non-traveling•non-power generating mode from the amount of fuel remaining in the fuel tank.

* * * * *